UNITED STATES PATENT OFFICE 2,676,193

1,2-DIBROMO-1,3,4,4-TETRACHLORO-1,2,3,4-TETRAFLUOROBUTANE

Robert P. Ruh, Midland, Mich., assignor to The Dow Chemical Company, Midland, Mich., a corporation of Delaware No Drawing. Application December 24, 1952, Serial No. 327,917

3 Claims. (Cl. 260—653)

This invention concerns a new compound, 1,2 - dibromo - 1,3,4,4 - tetrachloro - 1,2,3,4 - tetrafluorobutane, and a method for its preparation.

This compound is a colorless, high-boiling, non-flammable liquid which is stable against heat and oxidation. It has slight rubber-swelling characteristics and is useful as an additive to liquid organosiloxane polymers, particularly those having utility as hydraulic fluids. In such use the compound imparts lubricity and non-flammability to the polymers and counteracts the tendency of the organosiloxanes to shrink rubber. The compound 1,2-dibromo-1,3,4,4-tetrachloro - 1,2,3,4 - tetrafluorobutane has also been found to be effective as a fumigant against insects in grains.

This new compound may be prepared by the bromination of a perchlorofluorobutene, viz. 1,3,4,4 - tetrachloro - 1,2,3,4 - tetrafluorobutene - 1, according to the equation:

$CFCl=CFCFClCFCl_2 + Br_2 \rightarrow CFClBrCFBrCFClCFCl_2$

The reaction may be carried out in the liquid phase by mixing bromine with the perchlorofluorobutene in a suitable vessel and maintaining the resultant mixture at ordinary temperatures and pressures, e. g. below 80° C. at atmospheric pressure, until reaction is essentially complete. The process is exothermic and is catalyzed by actinic light, e. g. sunlight. Since the reaction is sluggish at about 25° C., a somewhat higher temperature of approximately 50° C. is usually employed. The bromine may all be initially charged into the reaction vessel together with the perchlorofluorobutene, or bromine may be added to the reaction mixture throughout the bromination. Approximately equimolecular or slightly greater than equimolecular proportions of $Br_2$ to $CFCl=CFCFClCFCl_2$ are employed. If desired, the bromination may be carried out in the presence of solvents for one or both of the reactants. These solvents should be essentially inert to bromine under the conditions of the reaction, ethylene dichloride, carbon tetrachloride, and chloroform being satisfactory.

Example

The bromination of 1,3,4,4-tetrachloro-1,2,3,4-tetrafluorobutene-1 obtained by the dimerization of $CFCl=CFCl$ as hereinafter described was carried out in a glass flask equipped with a reflux condenser. Approximately 266 grams (1 mole) of $CFCl=CFCFClCFCl_2$ and 160 grams (1 mole) of bromine were poured into the flask, mixed, and allowed to react at about 50° C. in direct sunlight for a total of 19.5 hours. Following bromination, the reaction product was washed free of bromine with dilute aqueous sodium carbonate, washed with water, and dried over anhydrous calcium chloride. Finally, the dry organic product was fractionally distilled under reduced pressure in a vacuum-jacketed still column packed with glass helices. There were obtained as separate fractions 21.5 grams of unreacted $CFCl=CFCFClCFCl_2$ and 334 grams of a brominated material identified by mass spectrometric analysis as $CFClBrCFBrCFClCFCl_2$.

The compound $CFClBrCFBrCFClCFCl_2$ is a water-white liquid having the following properties: boiling point 149° to 150° C. at 52 mm. Hg. absolute;

sp. gr. $\frac{25°}{4°}$ 2.2459; refr. ind. $\frac{25°}{D}$ 1.4929

The weight per cent composition of the compound produced as determined by laboratory analyses is compared with the theoretical composition in the following table:

| $CFClBrCFBrCFClCFCl_2$ | Observed | Theory |
|---|---|---|
| | Percent | Percent |
| Carbon | 11.33 | 11.26 |
| Chlorine | 33.8 | 33.34 |
| Bromine | 37.1 | 37.56 |
| Fluorine | 17.55 | 17.84 |

The $CFCl=CFCFClCFCl_2$ starting material employed in the bromination reaction was prepared by the dimerization of $CFCl=CFCl$ according to the following procedure.

A charge of 3198 grams of $CFCl=CFCl$ boiling at 21° to 22° C. was heated in a steel bomb at 250° C. for 20 hours. The pressure in the bomb rose to a maximum of 1000 pounds per square inch gauge at the start of the heating period and fell off gradually to about 200 pounds per square inch gauge towards the end of the run. Essentially all of the product was recovered and separated by fractional distillation, the weight per cent composition of which is as follows:

21.1% $CFCl=CFCl$
69.8% $CFCl=CFCFClCFCl_2$
8.7% Higher boiling material

The $CFCl=CFCFClCFCl_2$ boiled at 138° to 140° C. at 748 mm. mercury absolute. It was analyzed by mass spectrometry and the structural formula given above was found to be consistent with the mass spectrum. This finding was confirmed by dechlorinating a portion of the material with zinc in alcoholic solution to produce 1,4-dichloro-perfluorobutadiene, $CFCl=CFCF=CFCl$.

What is claimed is:

1. 1,2 - dibromo - 1,3,4,4 - tetrachloro - 1,2,3,4 - tetrafluorobutane.

2. A process of producing 1,2 - dibromo - 1,3,4,4 - tetrachloro - 1,2,3,4 - tetrafluorobutane which comprises reacting bromine with 1,3,4,4-tetrachloro-1,2,3,4-tetrafluorobutene-1.

3. The process of producing 1,2 - dibromo - 1,3,4,4 - tetrachloro - 1,2,3,4 - tetrafluorobutane which comprises mixing approximately equimolecular proportions of bromine and 1,3,4,4-tetrachloro-1,2,3,4-tetrafluorobutene-1 and allowing them to react at a temperature maintained above 25° C. but below 80° C.

No references cited.